US012806790B2

(12) United States Patent
Hayashi et al.

(10) Patent No.: US 12,806,790 B2
(45) Date of Patent: Nov. 24, 2026

(54) METHOD FOR ESTIMATING POSTURE OF OBJECT, CONTROL DEVICE, AND ROBOT SYSTEM

(71) Applicant: SEIKO EPSON CORPORATION, Tokyo (JP)

(72) Inventors: Masaki Hayashi, Matsumoto (JP); Sahar Ghavidel, Toronto (CA); Dong Li, Richmond Hill (CA)

(73) Assignee: SEIKO EPSON CORPORATION (JP)

( * ) Notice: Subject to any disclaimer, the term of this patent is extended or adjusted under 35 U.S.C. 154(b) by 191 days.

(21) Appl. No.: 18/824,992

(22) Filed: Sep. 5, 2024

(65) Prior Publication Data

US 2025/0073910 A1 Mar. 6, 2025

(30) Foreign Application Priority Data

Sep. 6, 2023 (JP) ................................ 2023-144435

(51) Int. Cl.
*G06T 7/593* (2017.01)
*B25J 9/16* (2006.01)
*G06T 7/70* (2017.01)

(52) U.S. Cl.
CPC ........... *B25J 9/1697* (2013.01); *B25J 9/1664* (2013.01); *G06T 7/593* (2017.01); *G06T 7/70* (2017.01); *G06T 2207/10012* (2013.01); *G06T 2207/20081* (2013.01)

(58) Field of Classification Search
None
See application file for complete search history.

(56) References Cited

U.S. PATENT DOCUMENTS

2019/0213481 A1 7/2019 Godard et al.
2022/0044471 A1* 2/2022 Tsai ........................ G06T 15/20
2022/0410381 A1* 12/2022 Stoppi ...................... G06T 7/50

FOREIGN PATENT DOCUMENTS

JP 2010-120141 A 6/2010
JP 2019-526878 A 9/2019
JP 2020-197978 A 12/2020

* cited by examiner

*Primary Examiner* — Sj Park

(74) *Attorney, Agent, or Firm* — Harness, Dickey & Pierce, P.L.C.

(57) ABSTRACT

A method for estimating a posture of an object includes: an image acquisition step of acquiring, by an imaging unit configured to image an area in which a plurality of objects are arranged, a two-dimensional image including at least one of the plurality of objects; a small area creation step of creating, for at least one object among the at least one object in the two-dimensional image, a small area surrounding the object; a type estimation step of estimating a type of the object surrounded by the small area; a selection step of selecting one of the small areas in which the type of the object has been estimated in the type estimation step; a depth estimation step of estimating a depth of the one of the small areas based on the two-dimensional image; and a posture estimation step of estimating a three-dimensional posture of the object included in the one of the small areas based on the type of the object and the depth estimated in depth estimation step.

9 Claims, 9 Drawing Sheets

| TYPES | RELIABILITY |
|---|---|
| COMPONENT 1 | 0.98 |
| COMPONENT 2 | 0.92 |
| COMPONENT 3 | 0.9 |

FIG. 9

| | ORDER | DEPTH ESTIMATION | POSTURE ESTIMATION | PICKING POSITION | ARRANGEMENT POSITION |
|---|---|---|---|---|---|
| COMPONENT A | 2 | YES | YES | PA | QA |
| COMPONENT B | 1 | YES | YES | PB | QB |
| COMPONENT C | 3 | YES | NO | – | QC |
| COMPONENT D | 4 | NO | NO | – | QD |

METHOD FOR ESTIMATING POSTURE OF OBJECT, CONTROL DEVICE, AND ROBOT SYSTEM

The present application is based on, and claims priority from JP Application Serial Number 2023-144435, filed Sep. 6, 2023, the disclosure of which is hereby incorporated by reference herein in its entirety.

BACKGROUND

1. Technical Field

The present disclosure relates to a method for estimating the posture of an object, a method for a robot to grasp an object, a control device, and a robot system.

2. Related Art

JP-A-2020-197978 discloses an object grasping system in which the position and rotation angle of an object are output from an image of the object using an inference model obtained by machine learning and a robot is caused to grasp the object. In the technique of JP-A-2020-197978, a rectangular bounding box is set in advance along the outer periphery of a two-dimensional image of a work to be detected, and an inference model in which the position and rotation angle of the bounding box have been learned is prepared. The inference model also learns a picking point that is a position for grasping by the robot on the surface of the work.

A plurality of works are arranged in stacks inside a basket in the work area of the robot. Two-dimensional images and depth images of a plurality of works are acquired by an imaging unit including a camera capable of acquiring a two-dimensional image and a depth camera capable of acquiring a depth image having information on the distance to an object. The inference model outputs, based on the two-dimensional images, the positions and rotation angles of the plurality of works in the basket or the coordinates of the picking points. In addition, based on the depth image, the inclination and surface roughness of each of the plurality of works at the picking point, which is a position at which the workpiece is to be grasped by the robot, and the distance to the picking point are calculated. Then, a work that is most likely to be grasped among the plurality of works is determined based on the inclination and surface roughness of the work at the picking point and the distance to the picking point. Then, the determined work is grasped by the robot.

In JP-A-2020-197978, only the positions and rotation angles of a plurality of works in a two-dimensional image are estimated by the inference model, and the depth image is used to estimate the distance to the picking point of each work. That is, the posture of the work in JP-A-2020-197978 is not estimated in consideration of the depth. For example, when a long and thin screw is arranged in a state in which only the distal end is shown in a two-dimensional image or in the case of an object having unevenness, there is a possibility that the robot cannot accurately grasp the object unless the posture of the object is estimated in consideration of the depth of each portion of the screw or the object in order for the robot to grasp the object. Therefore, a method for estimating the posture of an object in consideration of the depth of each portion of the object is required.

SUMMARY

According to a first aspect of the present disclosure, a method for estimating a posture of an object is provided. The method for estimating a posture of an object includes: an image acquisition step of, by an imaging unit configured to image an area in which a plurality of objects are arranged, a two-dimensional image including at least one of the plurality of objects; a small area creation step of creating, for at least one object among the at least one object in the two-dimensional image, a small area surrounding the object; a type estimation step of estimating a type of the object surrounded by the small area; a selection step of selecting one of the small areas in which the type of the object has been estimated in the type estimation step; a depth estimation step of estimating a depth of the one of the small areas based on the two-dimensional image; and a posture estimation step of estimating a three-dimensional posture of the object included in the one of the small areas based on the type of the object and the depth estimated in the depth estimation step.

According to a second aspect of the present disclosure, a method for a robot to grasp an object is provided. The method for a robot to grasp an object includes: an instruction step in the method for estimating a posture of an object according to the first aspect; an arrangement step of grasping one of the objects and arranging the one of the objects at a predetermined location by the robot based on the instruction; and an end determination step of determining, after the arrangement step, whether all the objects surrounded by the small areas created in the small area creation step have been arranged at the predetermined location by the robot. When it is determined that not all of the objects surrounded by the small areas created in the small area creation step are arranged at the predetermined location by the robot, the method proceeds to the selection step to select the small area that has not been selected, and when it is determined that all of the objects surrounded by the small areas created in the small area creation step have been arranged at the predetermined location by the robot, the method ends.

According to a third aspect of the present disclosure, a control device is provided. The control device controls: an imaging unit configured to image an area in which a plurality of objects are arranged, the imaging unit being configured to acquire a two-dimensional image including at least one of the plurality of objects; and a robot capable of grasping an object. The control device creates, for at least one object among the at least one object in the two-dimensional image, a small area surrounding the object, estimates a type of the object surrounded by the small area, selects one of the small areas in which the type of the object has been estimated, estimates a depth of the one of the small areas based on the two-dimensional image, estimates a three-dimensional posture of the object included in the one of the small areas based on the type of the object and the estimated depth, and instructs the robot to grasp the object based on the three-dimensional posture of the object.

According to a fourth aspect of the present disclosure, a robot system is provided. The robot system includes: an imaging unit configured to image an area in which a plurality of objects are arranged, the imaging unit being configured to acquire a two-dimensional image including at least one of the plurality of objects; a robot capable of grasping an object; and a control device controlling the imaging unit and the robot. The control device creates, for at least one object among the at least one object in the two-dimensional image, a small area surrounding the object, estimates a type of the object surrounded by the small area, selects one of the small areas in which the type of the object has been estimated, estimates a depth of the one of the small areas based on the two-dimensional image, estimates a three-dimensional posture of the object included in the one of the small areas based on the type of the object and the estimated depth, and instructs the robot to grasp the object based on the three-dimensional posture of the object.

BRIEF DESCRIPTION OF THE DRAWINGS

FIG. 9 is a diagram showing arrangement rules.

DESCRIPTION OF EMBODIMENTS

A. First Embodiment

A1. Configuration of First Embodiment

Figure 1:
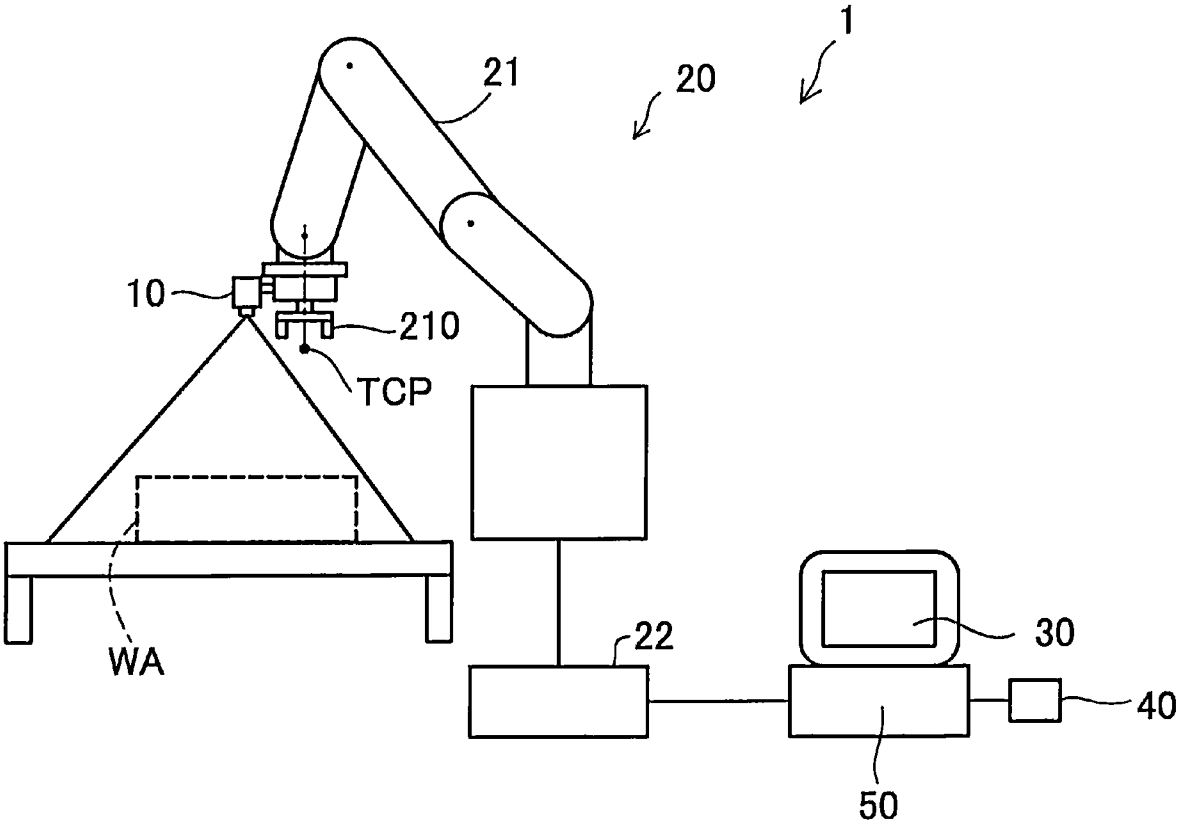
FIG. 1 is a schematic configuration diagram of a robot system according to the present embodiment.
Figure 2:
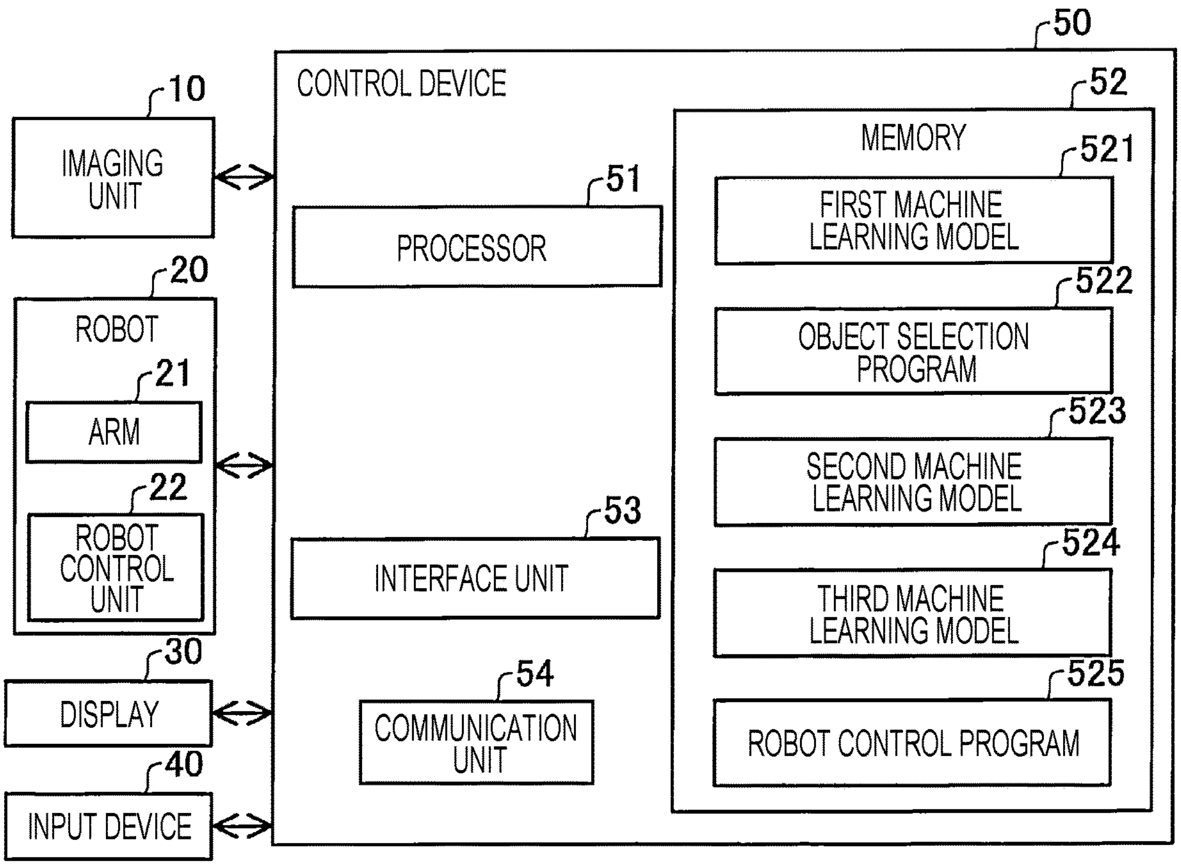
FIG. 2 is a block diagram of the robotic system.

FIG. 1 is a schematic configuration diagram of a robot system 1 according to the present embodiment. FIG. 2 is a block diagram of the robot system 1. The robot system 1 can estimate the three-dimensional postures of a plurality of objects and grasp the objects based on the estimated postures. As shown in FIG. 1, the robot system 1 includes an imaging unit 10, a robot 20, a display 30, an input device 40, and a control device 50. As shown in FIG. 2, the imaging unit 10, the robot 20, the display 30, and the input device 40 are electrically connected to the control device 50.

Figure 3:
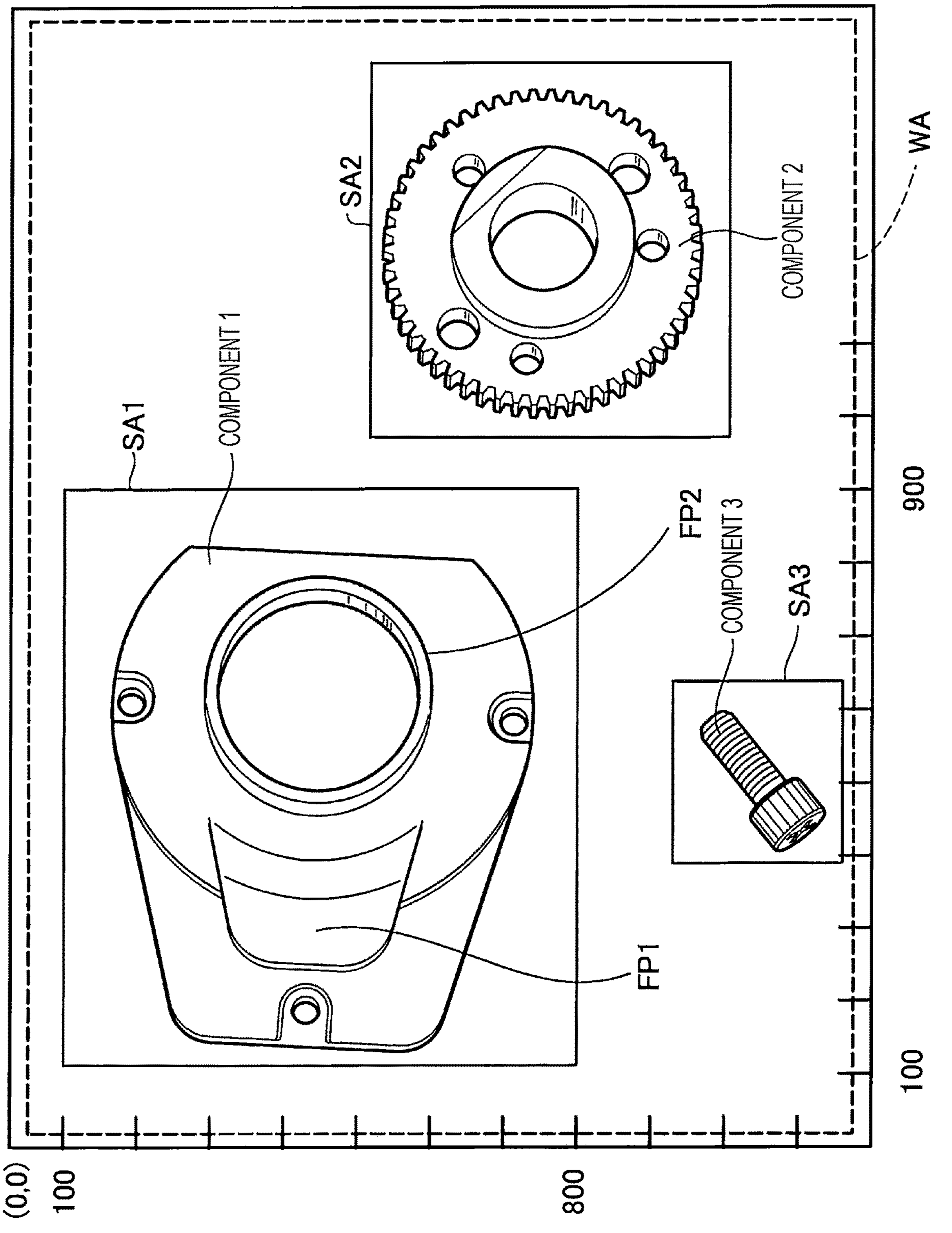
FIG. 3 is a diagram showing images of a plurality of objects captured by an imaging unit.

FIG. 3 is a diagram showing images of a plurality of objects captured by the imaging unit 10. The imaging unit 10 shown in FIG. 1 images an area in which a plurality of objects are arranged. In the present embodiment, the imaging unit 10 images an area in which a plurality of objects are arranged by imaging a range including the area in which the plurality of objects are arranged. Before describing the imaging unit 10 in detail, an area in which a plurality of objects are arranged will be described. In the present specification, both of an area in which a plurality of objects are to be arranged and an area in which a plurality of objects are arranged are referred to as a "work area WA". The work area WA is a portion surrounded by a broken line frame in FIGS. 1 and 3. In FIG. 1, no object is arranged in the work area WA. FIG. 3 shows a state in which a plurality of objects are arranged in the work area WA. In FIG. 3, three objects are arranged in the work area WA. As shown in FIG. 3, the three objects are individually referred to as component 1, component 2, and component 3.

The imaging unit 10 acquires a two-dimensional image including at least one of the plurality of objects by imaging the work area WA. In the present embodiment, the imaging unit 10 acquires a two-dimensional image including two or more of the plurality of objects. Specifically, in the present embodiment, a two-dimensional image including all of the three objects is acquired. Note that a case where not all of the plurality of objects are included in the image is a case where some of the objects overlap the other objects and accordingly are not included in the two-dimensional image. The imaging unit 10 images the work area WA under the control of the control device 50. In the present embodiment, the imaging unit 10 is a stereo camera that includes two cameras and outputs respective images. Note that FIG. 3 shows an image obtained by one of the two cameras. Which image acquired by which camera is to be used can be optionally changed by the operator. Note that both of the images acquired by the two cameras may be used.

The robot 20 shown in FIG. 1 can grasp an object. The robot 20 receives an instruction to grasp an object from the control device 50 and grasps the object. In detail, the robot 20 receives an instruction to grasp one specific object arranged in the work area WA from the control device 50 and grasps the one specific object. Then, the robot 20 moves the grasped object to the arrangement location, which is a predetermined location, according to an instruction from the control device 50. In FIG. 1, the arrangement location is not shown. In the present embodiment, the robot 20 grasps and moves all of the three objects shown in FIG. 3 one by one in response to the instruction from the control device 50. Details of the instruction from the control device 50 will be described later.

In the present embodiment, the robot 20 is a six-axis robot. As shown in FIG. 1, the robot 20 includes an arm 21 and a robot control unit 22. A hand 210 as an end effector is attached to the arm 21. The hand 210 can be implemented as a gripper or a suction pad capable of grasping an object. The term "grasping" refers to the robot 20 grasping an object and sucking an object. In the present embodiment, the hand 210 is a suction pad. At the distal end of the hand 210, a tool center point (TCP) is set as a control point of the robot 20. The control point TCP can be set at any position by the operator. The robot control unit 22 receives an instruction from the control device 50 and operates the arm 21. In the robot control unit 22, the type of object and a grasping method corresponding to the three-dimensional posture of the object is input in advance. The robot control unit 22 receives a grasping instruction including information on the three-dimensional posture of the object from the control device 50 and operates the arm 21 based on the information on the posture.

The display 30 displays an image captured by the imaging unit 10, an input image for the user to input various kinds of information to the control device 50, information estimated by the control device 50, and the like. The information estimated by the control device 50 will be described later. The input device 40 is a device for the user to input various kinds of information to the control device 50.

The control device 50 controls the imaging unit 10 and the robot 20. In addition, the control device 50 estimates the posture of the object and instructs the robot 20 to grasp the object. As shown in FIG. 2, the control device 50 includes a processor 51, a memory 52, an interface unit 53, and a communication unit 54. The processor 51 realizes various functions by using a program stored in the memory 52. The memory 52 stores a first machine learning model 521, an object selection program 522, a second machine learning model 523, a third machine learning model 524, and a robot control program 525.

The first machine learning model 521 is a machine learning model that receives data of a two-dimensional image captured by the imaging unit 10 as an input value, creates a small area surrounding at least one object among one or more objects included in the image, and outputs the type of the object surrounded by the small area and the two-dimensional coordinates of the small area. Since the control device 50 uses the first machine learning model 521, a small area is created, and the type of an object surrounded by the small area and the coordinates of the small area are estimated. In the present embodiment, for each of two or more objects among a plurality of objects included in an image, a small area surrounding the object is created. Specifically, as shown in FIG. 3, for each of all the three objects in the image, a small area surrounding the object is created. Then, the type and two-dimensional coordinates of the object surrounded by the created small area are estimated. The small area is expressed by a rectangular frame surrounding the object or a line along the outer contour of the object. In the present embodiment, the small area is expressed as a rectangular frame surrounding the object, as shown in FIG. 3. The type of the object is output as an ID. For example, the component 1 is output as ID1, the component 2 is output as ID2, and the component 3 is output as ID3.

The two-dimensional coordinates of a small area will be described. As an example, the two-dimensional coordinates of a first small area SA1, which is a small area surrounding the component 1 in FIG. 3, will be described. As a premise, coordinates are determined in advance for pixels forming an image captured by the imaging unit 10. As shown in FIG. 3, with the upper left corner of the screen as the origin, a direction toward the right of the page is the X axis, a direction toward the top of the page is the Y axis, and the coordinates of the pixels are expressed by real numbers. Note that the coordinates shown in FIG. 3 are shown for explanation, and are not actually shown in the image. The coordinates of the origin are (0 pixel on the X axis, 0 pixel on the Y axis). The first small area SA1 ranges from 100 pixels to 900 pixels in the X-axis direction and ranges from 100 pixels to 800 pixels in the Y-axis direction. Therefore, the coordinates of the first small area SAL are expressed as "100 to 900 pixels on the X axis and 100 to 800 pixels on the Y axis". Although the size and coordinates of the pixel have been described above for convenience, the size and coordinates of the pixel can be changed optionally. For the sake of convenience, the small areas created in FIG. 3 are shown, but no small area is shown in the image acquired by the imaging unit 10.

In addition, in the present embodiment, since the first machine learning model 521 is used by the control device 50, the degree of reliability of the type of the object surrounded by the small area is output. When the types of the objects surrounded by different small areas are the same, the degrees of reliability for the respective small areas may be different depending on the light environment of the work area WA or the posture of the object. In addition, for example, when a plurality of objects overlap each other, the reliability of the type estimated for the object whose surface is most exposed in the two-dimensional image captured by the imaging unit 10 tends to be the highest. The degree of reliability is expressed as a numerical value normalized by 0 to 1, and the numerical value 1 is the highest reliability.

The first machine learning model 521 is created by performing machine learning including deep learning in advance outside the robot system 1. The first machine learning model 521 is a trained model that estimates the type of an object and generates a small area. As a machine learning method, for example, an object detection algorithm such as R-CNN (Region Based Convolutional Neural Networks), SSD, or YOLO (You Look Only Once) is adopted. As teacher data for machine learning, an image in which the type of an object and a small area surrounding the object are labeled with correct data is used. The teacher data may be created by an operator assigning a label of a type and a size of a small area based on an image obtained by imaging an object, or may be created by generating a two-dimensional image including an object and assigning a label of a type and a size of a small area by simulation using a CAD model.

The object selection program 522 is a program for selecting one small area among the small areas for which the type of object has been estimated by the control device 50 using the first machine learning model 521. In detail, the object selection program 522 is a program for selecting an object for which depth estimation using the second machine learning model 523 described later is performed. In the present embodiment, by using the object selection program 522, the control device 50 selects one small area based on the degree of reliability of the type of the object surrounded by the small area, which is output from the first machine learning model 521. Specifically, the control device 50 selects one small area having the highest reliability among the reliabilities for the estimated types of the objects surrounded by the small areas, which are output from the first machine learning model 521, using the object selection program 522.

The second machine learning model 523 is a machine learning model that outputs the depth of one small area based on a two-dimensional image. In detail, the second machine learning model 523 is a machine learning model that receives, as input data, the type of an object surrounded by one small area and a two-dimensional image captured by the imaging unit 10 and outputs the depth of the small area. As input data, respective two-dimensional images acquired by two cameras at different positions that form the imaging unit 10 are used. By using the second machine learning model 523, the depth of the small area is estimated based on the type of the object estimated by the first machine learning model 521 and the two-dimensional image.

The second machine learning model 523 is a combination of trained models for which machine learning has been performed in advance for each type of object. An appropriate trained model is selected according to the estimated type of the object by the processor 51 of the control device 50. As input data for machine learning, images of a small area including an object, which are acquired by two cameras, are used. The depth of an image of a small area including an object is used as teacher data for machine learning. Note that the teacher data may be an image captured using a real object and a depth created by a depth sensor, or may be created by an ideal depth of a virtual image created by two cameras in simulation. In the trained model forming the second machine learning model 523, machine learning including deep learning is performed in advance outside the robot system 1. As a machine learning method for the second machine learning model 523, GC-Net (End to End Learning of Geometry and Context for Deep Stereo Regression), which is a depth estimation algorithm, is used.

The third machine learning model 524 is a machine learning model used to estimate the three-dimensional posture of an object included in one small area based on the type of the object and the estimated depth of the small area. In the present embodiment, the third machine learning model 524 is a trained machine learning model that receives the type of the object, the estimated depth of the small area, and the two-dimensional image captured by the imaging unit 10 as input data and outputs the three-dimensional posture of the object. By using the third machine learning model 524, the control device 50 estimates the coordinates of each of important points, which are one or more points set in advance for the input object type, based on the input two-dimensional image. The important point is, for example, a portion easily grasped by the robot 20 or an end portion of the object. Then, by using the third machine learning model 524, the control device 50 estimates the three-dimensional posture of the object based on the depth of the small area and the deviation between the coordinates of the predetermined reference posture of the object and the coordinates of each of one or more important points. The coordinates of the estimated three-dimensional posture are converted into coordinates based on the control point TCP as the control point TCP of the robot 20 by the processor 51 of the control device 50.

The third machine learning model 524 is a combination of trained models for which machine learning has been performed in advance for each type of object. The processor 51 of the control device 50 selects an appropriate trained model according to the estimated type of the object included in the small area whose depth has been estimated using the second machine learning model 523. In the trained model forming the third machine learning model 524, machine learning including deep learning is performed in advance outside the robot system 1. As a machine learning method, PVN3D (A Deep Point-wise 3D Keypoints Voting Network for 6DoF Pose Estimation) is used. Since PVN3D uses image information in addition to depth information, it is considered that the accuracy of the estimation of the three-dimensional posture is higher than that of an algorithm that does not use image information. As teacher data for machine learning, a posture created from an image and a depth of a small area including an object is used. Similarly to the creation of the second machine learning model 523, the teacher data may be created by the operator manually measuring an image and a depth, or may be created by simulation.

The robot control program 525 is configured by a plurality of commands for operating the robot 20.

The interface unit 53 receives an input from the user through the input device 40. The communication unit 54 transmits an instruction to the imaging unit 10 and the robot control unit 22.

Figure 4:
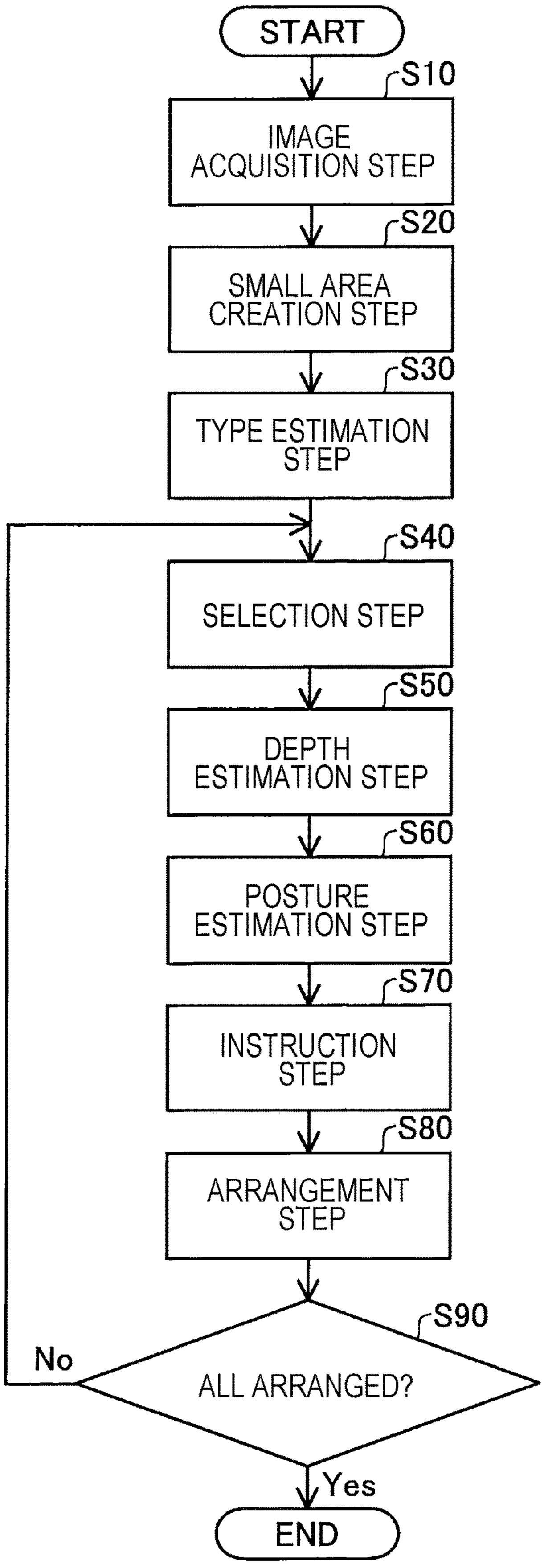
FIG. 4 is a flowchart showing an example of a method for estimating the posture of an object and a method for a robot to grasp an object according to a first embodiment.

A2. Method for Estimating the Posture of an Object and Method for the Robot 20 to Grasp an Object FIG. 4 is a flowchart showing an example of a method for estimating the posture of an object and a method for the robot 20 to grasp an object according to the first embodiment. As a premise, it is assumed that the three objects shown in FIG. 3 are arranged in the work area WA shown in FIG. 1. First, in step S10 of FIG. 4, the imaging unit 10 captures a two-dimensional image including the three objects arranged in the work area WA. The imaging unit 10 transmits the acquired two-dimensional image to the control device 50. Step S10 is referred to as an "image acquisition step".

In step S20 of FIG. 4, the control device 50 creates, for at least one of the one or more objects in the two-dimensional image, a small area surrounding the object. The control device 50 creates a small area surrounding the object in one of the two two-dimensional images acquired by the two cameras. In the present embodiment, for each of the three objects included in the image, a small area surrounding the object is created. Specifically, the control device 50 creates a small area surrounding each of the three objects shown in FIG. 3 by using the first machine learning model 521. In FIG. 3, the first small area surrounding the component 1 is denoted by SA1, the second small area surrounding the component 2 is denoted by SA2, and the third small area surrounding the component 3 is denoted by SA3. Step S20 is referred to as a "small area creation step".

In step S30 of FIG. 4, the control device 50 estimates the type of the object surrounded by the small area and the two-dimensional coordinates of the small area. In the present embodiment, the control device 50 estimates, for each of the first small area SA1 to the third small area SA3, the type of the object surrounded by the small area and the two-dimensional coordinates of the small area by using the first machine learning model 521. In the present embodiment, the control device 50 outputs the reliability of the type of object estimated for each of the three small areas by using the first machine learning model 521. Step S30 is referred to as a "type estimation step".

Figures 5, 6:
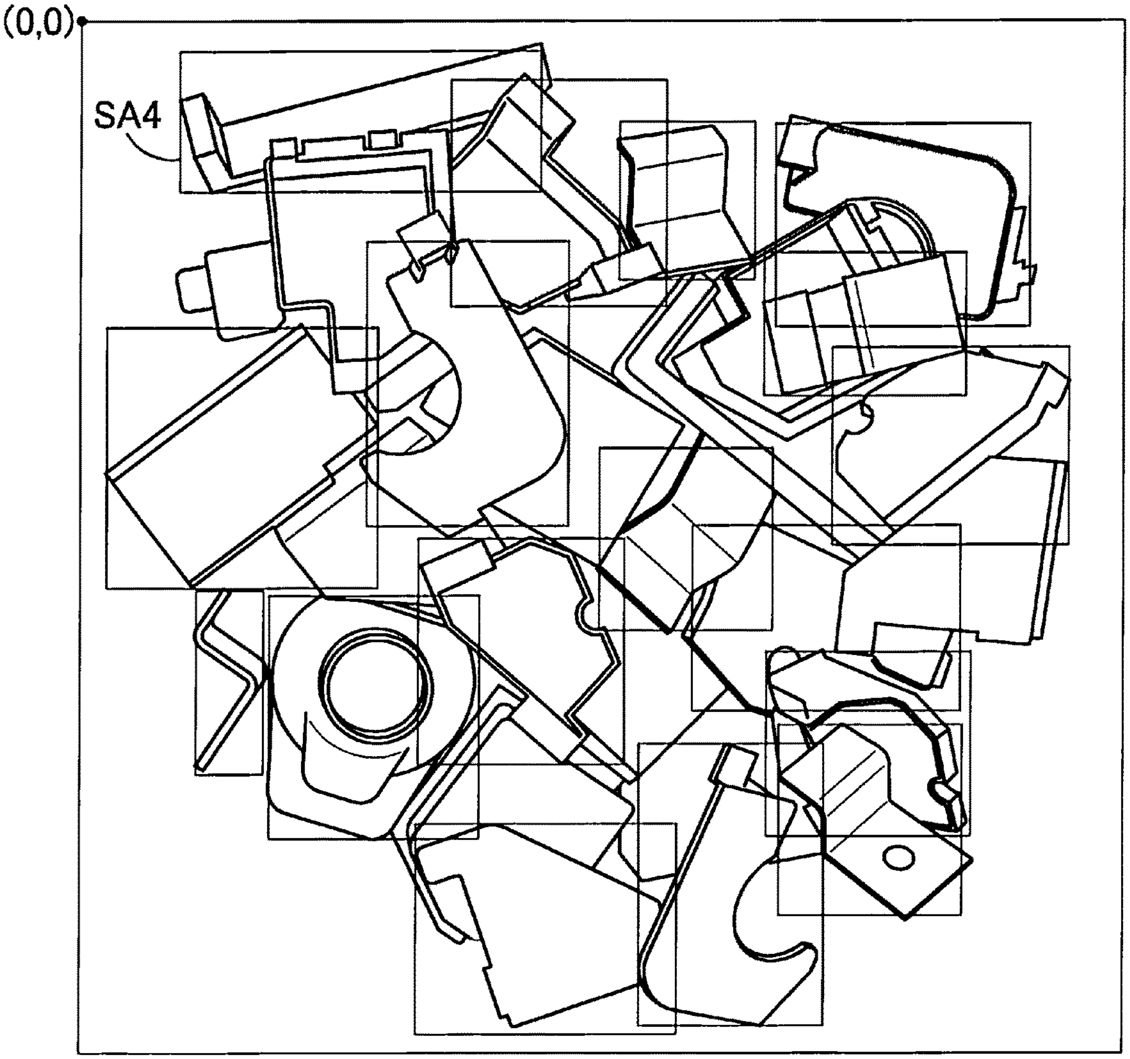
FIG. 5 is a table of the degree of reliability output for each of three small areas.
FIG. 6 is a diagram showing an image obtained by imaging a work area in which a plurality of objects are arranged in a second embodiment.

FIG. 5 is a table of the reliability output for each of the three small areas. In step S40 of FIG. 4, the control device 50 selects one small area among the small areas for which the type of object has been estimated in the type estimation step. In the present embodiment, the control device 50 selects one small area based on the degree of reliability of the estimated type of the object surrounded by each of the three small areas by using the object selection program 522. As shown in FIG. 5, the reliability of the component 1 is the highest among the components 1 to 3. Therefore, the first small area SA1 surrounding the component 1 is selected. Step S40 is referred to as a "selection step".

In step S50 of FIG. 4, the control device 50 estimates the depth of the selected one small area using the second machine learning model 523. In the present embodiment, as described above, the control device 50 estimates the depth of the small area based on the type of the object surrounded by the selected one small area and the two-dimensional image acquired by the imaging unit 10 using the trained model prepared in advance according to the type of the object. As described above, since the first small area SA1 is selected in the selection step, the control device 50 measures the depth using the trained model corresponding to the estimated type of the object included in the first small area SA1. Step S50 is referred to as a "depth estimation step".

In step S60, the control device 50 estimates the three-dimensional posture of the object included in one small area based on the estimated type of the object, the depth estimated in the depth estimation step, and the two-dimensional image. The control device 50 estimates the three-dimensional posture of the component 1 included in the first small area SA1 by using the third machine learning model 524. Step S60 is referred to as a "posture estimation step".

In step S70, the control device 50 instructs the robot 20 to grasp the object based on the three-dimensional posture of the object estimated in the posture estimation step. In detail, the communication unit 54 of the control device 50 transmits, to the robot control unit 22 of the robot 20, an instruction including the estimated posture of the component 1 whose posture has been estimated in the posture estimation step, the coordinates of the portion to be grasped, the arrangement position at the arrangement location, and the operation method of the arm 21. Note that the coordinates of the object are converted into coordinates based on the control point TCP of the robot 20 and transmitted. Step S70 is referred to as an "instruction step".

In step S80, the robot 20 grasps the component 1 based on the instruction and the information on the posture of the component 1. The robot 20 arranges the component 1 at the arrangement location. Step S80 is referred to as an "arrangement step". After arranging the object at the arrangement location, the robot control unit 22 transmits, to the control device 50, a signal indicating that the arrangement of the object instructed to be arranged has been completed.

In step S90, the control device 50 determines whether all of the objects surrounded by the small areas created in the small area creation step have been arranged at predetermined locations by the robot 20. In the present embodiment, it is determined whether all of the three objects have been arranged at predetermined locations. This step is referred to as an "end determination step". First, after the arrangement step, the range including the work area WA is imaged by the imaging unit 10. The control device 50 determines whether an object surrounded by a small area is included in the image by comparison with the image acquired in step S10. When the object surrounded by the small area is included in the image, it is determined that not all of the objects surrounded by the small areas are arranged at the arrangement location by the robot 20. In this case, the process proceeds to the selection step. As described above, since the arrangement of the component 1 at the predetermined location is completed, only the components 2 and 3 are arranged in the work area WA. In the selection step again, as shown in FIG. 5, the second small area SA2 having higher reliability than the third small area SA3 is selected from the second small area SA2 and the third small area SA3 which have not been selected. When the control device 50 determines that all of the objects surrounded by the small areas have been arranged at the predetermined location by the robot 20, the process ends.

In the present embodiment, the posture of the object can be estimated in consideration of the depth of the object. In addition, for example, compared to an aspect in which the depths of all of the plurality of objects are calculated based on the depth of the area including all of the plurality of objects, the area in which the depth is estimated is reduced. There is a low possibility that an object other than the object whose depth is to be estimated is included in the area. Therefore, the accuracy of depth estimation is improved. In addition, an instruction based on the posture of the object estimated in consideration of the depth of the object can be given to the robot 20.

In the present embodiment, the depth is estimated using a trained model corresponding to the type of the object. For example, it is possible to reduce learning data and learning time compared to an aspect in which the trained model calculates the depths of all of the plurality of objects based on the depth of the area including all of the plurality of different types of objects. In addition, for example, when the type of the object is changed, a trained model for only the new object may be created, and it is not necessary to cause the trained model to learn the depth of the area including all of the plurality of different types of objects again. Therefore, it is possible to efficiently operate the method for estimating the posture of the object.

In addition, in the present embodiment, one small area selected in the selection step is selected based on the degree of reliability of the estimated type of object. Since the posture of an object with high reliability is estimated, the accuracy of the estimated posture may be higher than that of an object with low reliability. For this reason, there is a high possibility that the robot 20 can reliably perform grasping. In addition, in the present embodiment, a small area that has not been selected is selected again in the selection step after the end determination step. All of the objects surrounded by the small areas created in the small area creation step can be arranged at the arrangement location by the robot 20.

In the present embodiment, the imaging unit 10 is a stereo camera. For example, when depth information of a two-dimensional image is acquired using RGBD, the imaging timings of the RGB camera and the Depth camera may be different. By using the stereo camera, the depth can be estimated based on a plurality of two-dimensional images captured at the same time. Therefore, images and depths acquired at the same time can be acquired. Therefore, for example, even when the object is being transported on a conveyer belt, the posture of the object can be accurately estimated.

B. Second Embodiment

The second embodiment is different from the first embodiment in terms of the method of creating a small area in the small area creation step, the method of selecting a small area in the selection step, the number of objects arranged in the work area WA, and the state of arrangement of objects. Since the other configurations are the same as those in the first embodiment, the same reference numerals are used and the detailed description thereof will be omitted.

In the second embodiment, the control device 50 selects one small area based on the coordinates of each of a plurality of small areas by using the object selection program 522. Specifically, the control device 50 selects a small area located at coordinates closest to the predetermined coordinates. In the present embodiment, the predetermined coordinates are the origin (0 pixel on the X axis, 0 pixel on the Y axis). The smallest numerical value of the coordinates of the small area is compared with the origin. For example, when a plurality of small areas having the same distance between the minimum coordinates of the X axis and the Y axis and the origin are created such that the coordinates of one small area are (100 to 1000 pixels on the X axis, 200 to 500 pixels on the Y axis) and the coordinates of another small area are (200 to 300 pixels on the X axis, 100 to 500 pixels on the Y axis), the small area having the smallest numerical value on the Y axis is selected. The predetermined coordinates and the method of selecting the closest coordinates can be changed optionally.

FIG. 6 is a diagram showing an image acquired by imaging the work area WA in which a plurality of objects are arranged in the second embodiment. In the second embodiment, imaging is performed such that the range of imaging of the imaging unit 10 and the work area WA match each other. In step S10 of FIG. 4, as shown in FIG. 6, the imaging unit 10 captures a two-dimensional image including a plurality of objects arranged in the work area WA. In the second embodiment, as shown in FIG. 6, a plurality of objects are arranged so as to overlap each other.

In step S20 of FIG. 4, the control device 50 creates a small area surrounding each of at least one object among the plurality of objects in the image. In FIG. 6, for convenience of understanding, a rectangular frame representing a small area is shown. In the second embodiment, as shown in FIG. 6, small areas surrounding not all but some of the plurality of objects included in the image are created. The control device 50 creates a small area for the detected object using the first machine learning model 521. As shown in FIG. 6, there are objects that are overlapped with other objects and for which no small areas are created. As shown in FIG. 6, the first machine learning model 521 is set such that, although two or more objects may be included in the same small area, only one object is recognized as being included in the small area by the control device 50. Note that in the second embodiment, in step S30 of FIG. 4, the reliability is not output for each of the estimated types of objects surrounded by the small areas.

In step S50 of FIG. 4, the control device 50 selects one small area. In the second embodiment, the control device 50 selects one small area based on the coordinates of each of the plurality of small areas by using the object selection program 522. Among the plurality of small areas shown in FIG. 6, a fourth small area SA4 closest to the origin (0 pixel on the X axis, 0 pixel on the Y axis) is selected. In step S70 of FIG. 4, an object is arranged at the arrangement location by the robot 20. In the second embodiment, the robot 20 arranges objects side by side at the arrangement location.

In step S90 of FIG. 4, the control device 50 determines whether all of the objects surrounded by the small areas have been arranged at the arrangement location by the robot 20. In the second embodiment, the control device 50 determines whether all the objects surrounded by the small areas shown in FIG. 6 have been arranged at the arrangement location. Then, after the process ends, the operator causes the control device 50 to perform the process of step S10 in FIG. 4 again. When a part of an object arranged in the work area WA is moved to the arrangement location, an object which is not surrounded by the small area in the previous process is surrounded by the small area. Therefore, by repeating the process, all the objects are arranged at the arrangement location. Note that the position and posture of the object may be changed by the operator or the robot 20 before the process of step S10 is performed again.

In the second embodiment, it is possible to cause the robot 20 to grasp the object based on the coordinates of the small area surrounding the object. Therefore, the robot 20 can quickly grasp the object.

C. Third Embodiment

The third embodiment is different from the first embodiment in terms of the method of selecting a small area in the selection step, the type and number of objects arranged in the work area, and the method of arrangement in the arrangement step. Since the other configurations are the same as those in the first embodiment, the same reference numerals are used and the detailed description thereof will be omitted.

A control device 50 according to the third embodiment selects one small area based on a predetermined order of objects to be grasped by the robot 20 by using the object selection program 522. In the memory 52 of the control device 50, the order of objects to be arranged at the arrangement location and the method of arrangement by the robot 20 are input in advance by the operator. The order of objects to be arranged at the arrangement location corresponds to the order of objects to be grasped by the robot 20. For example, when the order in which the objects are arranged is determined in order to cause the robot 20 to perform the assembly work or when the objects need to be arranged according to the front and back surfaces or the postures of the objects, the order is input in advance by the operator.

Figure 7:
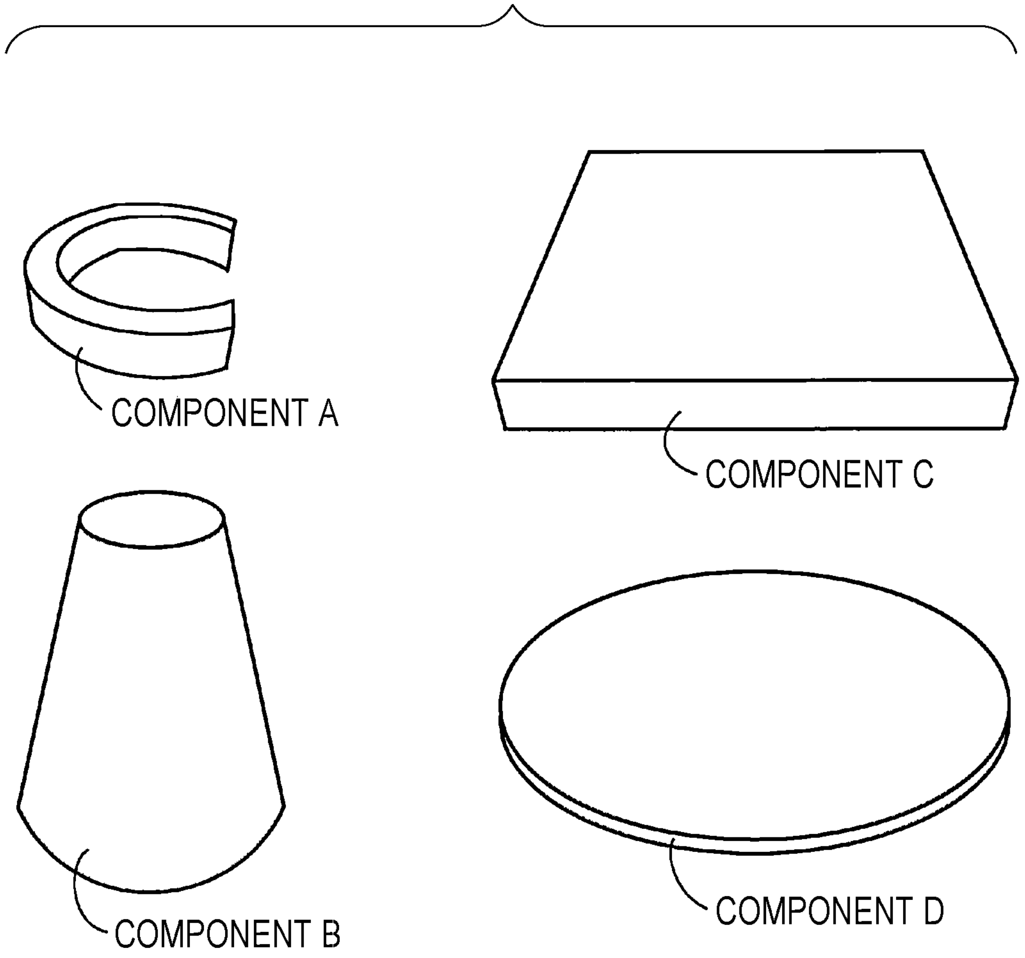
FIG. 7 is a diagram showing four objects arranged in a work area in a third embodiment.

FIG. 7 is a diagram showing four objects arranged in the work area WA in the third embodiment. FIG. 7 is not a diagram showing an image captured by the imaging unit 10. In the third embodiment, "arrangement rules" indicating the type of an object whose posture is to be estimated and the type of an object whose posture is not to be estimated are input to the object selection program 522 of the control device 50 in advance by the operator. Specifically, the types of components A and B are input as types of objects whose postures are to be estimated. The component A is an object that needs to be arranged so as to overlap the component B at the arrangement location. The types of components C and D are input as types of objects whose postures are not to be estimated.

Figure 8:
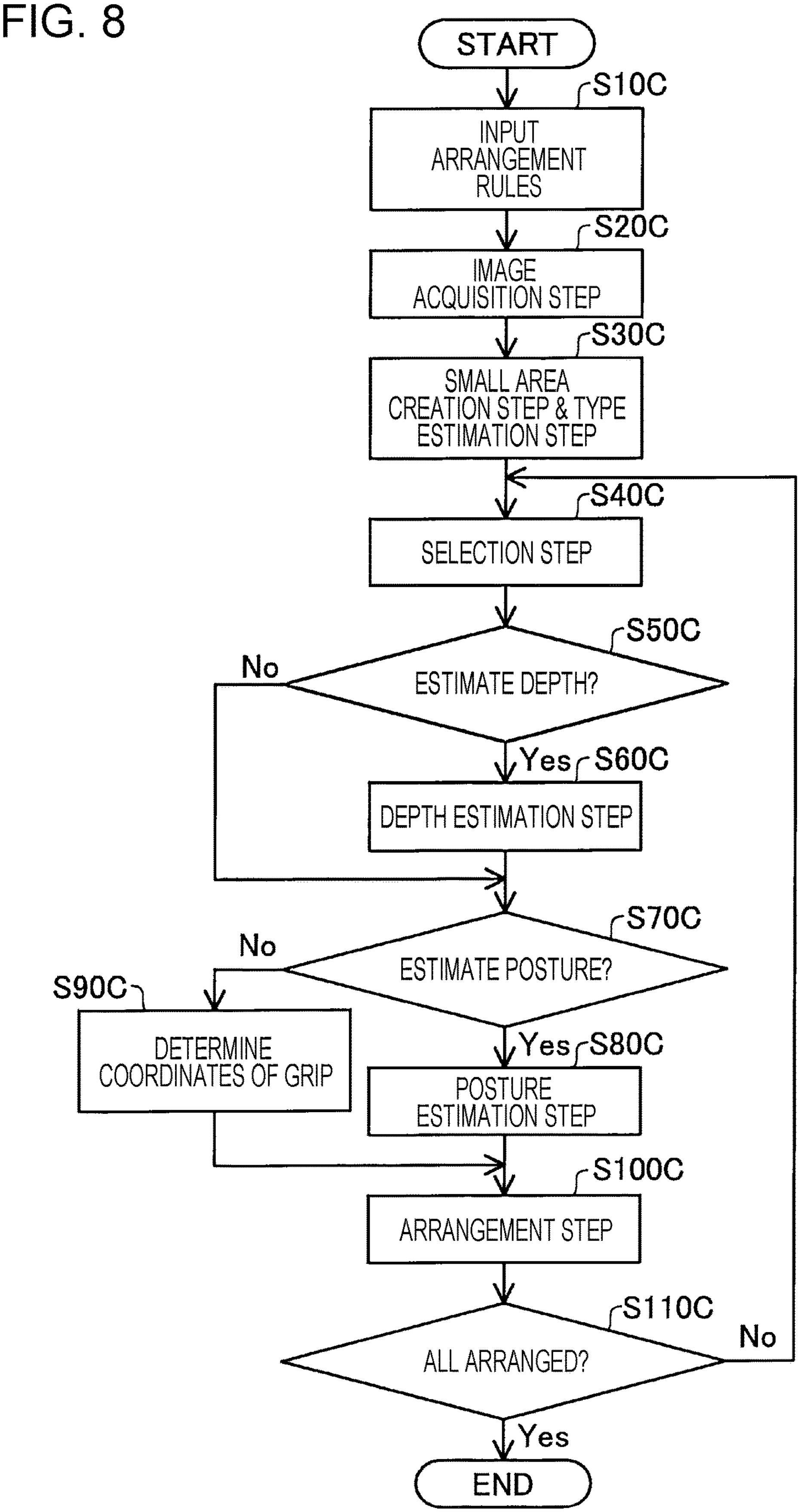
FIG. 8 is a flowchart showing an example of a method for estimating the posture of an object and a method for a robot to grasp an object according to the third embodiment.

FIG. 8 is a flowchart showing an example of a method for estimating the posture of an object and a method for the robot 20 to grasp an object according to the third embodiment. In step S10C of FIG. 8, arrangement rules are input to the object selection program 522 of the control device 50 by the operator. In step S20C, an image including four components arranged in the work area WA is acquired by the imaging unit 10. The process of step 20C is the same as that of step S10C in FIG. 4. In step S30C of FIG. 8, the small area creation step and the type estimation step are executed.

FIG. 9 is a diagram showing arrangement rules. In step S40C of FIG. 8, the control device 50 selects a small area based on the order of grasping objects by using the object selection program 522. As shown in FIG. 9, the order is determined in the order of the component B, the component A, the component C, and the component D. The control device 50 selects a small area surrounding the component B with the earliest order. The order is determined in advance by the operator depending on whether or not the posture needs to be estimated, whether or not the depth needs to be estimated, and the like.

In step S50C of FIG. 8, the control device 50 determines whether or not it is necessary to estimate the depth of the small area selected in the selection step. The determination is performed according to the arrangement rules. In the arrangement rules shown in FIG. 9, the component B, which is an object with the earliest order, needs to overlap the component A as described above. Therefore, the posture needs to be estimated. The same applies to the component A as to the component B. For the component C, it is not necessary to estimate the posture for grasping by the robot 20. However, since estimating the depth makes it easier for the robot 20 to grasp, the depth needs to be estimated by the operator. Since the component D can be sucked by the hand 210 by bringing the robot 20 close to the component D, the operator does not need to estimate the depth. When it is determined that the depth needs to be estimated, the process proceeds to step S60C. When it is determined that it is not necessary to estimate the depth, the process proceeds to step S70C.

In step S60C of FIG. 8, the depth estimation step is executed by the control device 50. In step S70C, the control device 50 determines whether or not it is necessary to estimate the posture of the small area selected in the selection step. When it is determined that the posture needs to be estimated, the process proceeds to step S80C. When it is determined that it is not necessary to estimate the posture, the process proceeds to step S90C. In step S80C, the posture estimation step is executed. In step S90C, the control device 50 determines coordinates for grasping by the robot 20. In the present embodiment, the control device 50 determines the center of the small area as the coordinates of the grasping by the robot 20. In step S90C, when the depth estimation step is executed in step S60C, the estimated depth is determined as the information of the depth necessary for the robot 20 to grasp. In step 90*c*, when the depth estimation step is not executed in step S60C, an initial value set in advance is determined as the information of the depth necessary for the robot 20 to grasp. In the present embodiment, the depth of a workbench on which no object is arranged with respect to the imaging unit 10 is set to the initial value. Note that the initial value can be optionally changed.

In step S100C, the arrangement step is executed by the robot 20. The robot 20 grasps an object and arranges the object at the arrangement location according to the picking position and the arrangement position that are determined in advance for each type of object as shown in FIG. 9. As described above, the postures at which the component A and the component B are arranged are determined in advance. In the grasping of the component A or the component B, the robot 20 grasps the object based on the instruction received from the control device 50. On the other hand, for the component C or the component D, the robot 20 arranges the object at the arrangement location regardless of the posture of the object.

In step S110C, the control device 50 executes the end determination step. In the end determination step, when it is determined that all of the components A to D have been arranged at the predetermined locations, the process ends. In the end determination step, when it is determined that not all of the components A to D have been arranged at the predetermined locations, the process proceeds to step S40C again. In step S40C again, a small area including an object next in order to the object included in the small area selected in the previous process is selected.

Figure 10:
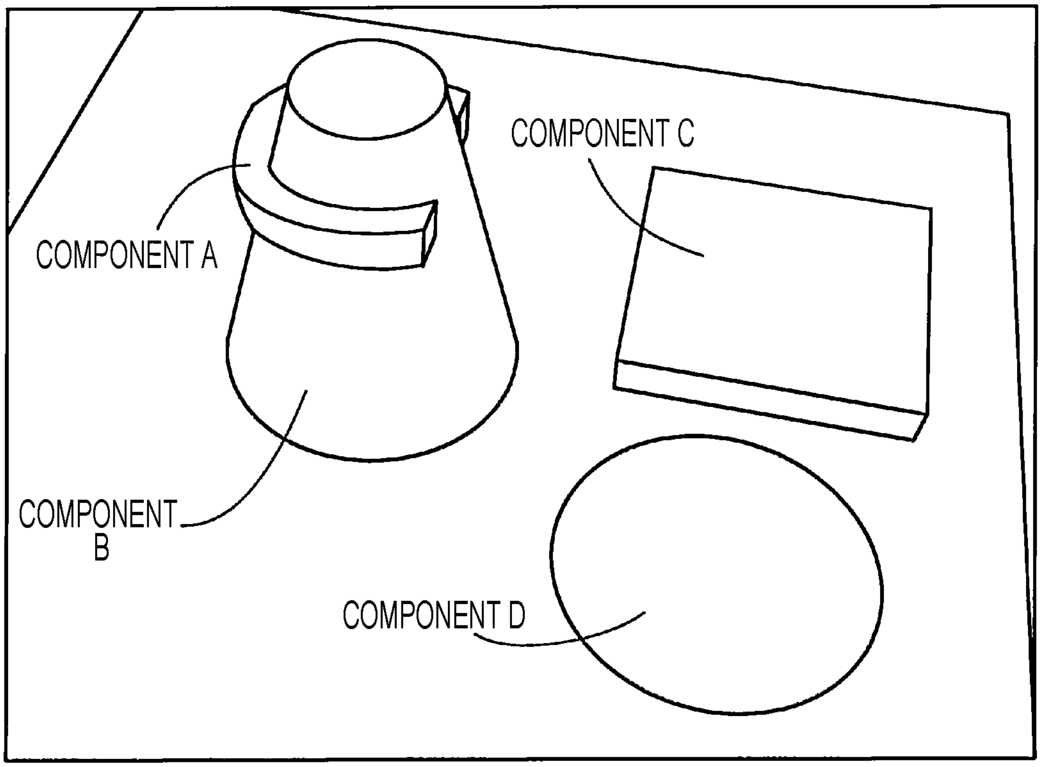
FIG. 10 is a diagram showing a state in which the four objects shown in FIG. 7 are arranged at predetermined locations.

FIG. 10 is a diagram showing a state in which the four objects shown in FIG. 7 are arranged at the arrangement locations. As shown in FIG. 10, the component A overlaps the component B. As described above, in the third embodiment, the robot 20 can arrange a plurality of objects at the arrangement locations so as to overlap each other.

D. Other Embodiments

D1. Alternative Embodiment 1

(1) In the first embodiment described above, the imaging unit 10 images the area in which a plurality of objects are arranged by imaging the range including the area in which the plurality of objects are arranged. Note that the imaging unit may perform imaging so as not to include a range other than the work area.

(2) In the first embodiment described above, small areas are created for all of the three detected objects. Note that, for example, in an aspect in which the three objects are all of the same type and an instruction to cause the robot to arrange any two objects at the arrangement location is input to the control device, the control device may select two objects among the three detected objects using the first machine learning model, create small areas for the two objects, and cause the robot to grasp the two objects in order.

(3) In the embodiment described above, the first machine learning model 521, the second machine learning model 523, and the third machine learning model 524 are created by performing machine learning including deep learning in advance outside the robot system 1. The control device may include a teacher data creation unit that creates teacher data and a learning execution unit that executes machine learning, and the first machine learning model, the second machine learning model, and the third machine learning model may be created in the control device.

(4) In the embodiment described above, the imaging unit 10 acquires a two-dimensional image including a plurality of objects. For example, in an aspect in which a plurality of objects are arranged in the work area, the imaging unit may acquire a two-dimensional image including only one of the objects. In this aspect, a small area surrounding the one object is created in the small area creation step, and the small area is selected in the selection step.

(5) In the embodiment described above, in the type estimation step, the two-dimensional coordinates of the small area are output. Note that, for example, in an aspect in which the object is not arranged at the arrangement location by the robot, the first machine learning model may not output the two-dimensional coordinates of the small area, and the two-dimensional coordinates of the small area may not be estimated in the type estimation step.

(6) In the embodiment described above, the second machine learning model 523 is a machine learning model that receives, as input data, the type of an object surrounded by one small area and a two-dimensional image captured by the imaging unit 10 and outputs the depth of the small area. Note that, for example, the second machine learning model may be a machine learning model that receives, as input data, the type of an object surrounded by one small area and a two-dimensional image captured by the imaging unit and outputs the depths of a plurality of points set in advance according to the estimated type of the object. In this aspect, the second machine learning model has already learned feature points that are a plurality of points necessary for the third machine learning model to estimate a three-dimensional posture. The feature point is determined in advance by the operator according to the type of the object, and is, for example, a part that can be sucked by the hand of the robot or a part that is likely to come into contact with the hand when the robot grasps the object. Therefore, grasping by the robot can be performed with high accuracy. In addition, for example, in an aspect in which all the objects included in the two-dimensional image are of the same type, the depth of one small area may be estimated based on the two-dimensional image.

(7) In the embodiment described above, the control device 50 executes the posture estimation step based on the type of the object, the estimated depth of the small area, and the two-dimensional image by using the third machine learning model 524. For example, in an aspect in which the coordinates of each of the important points that are one or more points determined in advance for the input type of the object are not estimated, the posture estimation step may be executed based on the type of the object and the estimated depth of the small area.

(8) In the embodiment described above, the robot is a six-axis robot. The robot may be a SCARA robot.

D2. Alternative Embodiment 2

In the embodiment described above, the robot system 1 includes the robot 20, and the robot 20 is instructed to grasp an object based on the three-dimensional posture of the object. For example, in a system that does not include a robot, an object may not be grasped based on the three-dimensional posture of the object.

D3. Alternative Embodiment 3

In the embodiment described above, the depth is estimated by using a trained model prepared in advance according to the type of the object. Note that the depth may be estimated by the operator based on the type of the object and the depth of the area.

D4. Alternative Embodiment 4

In the embodiment described above, in the selection step, one small area is selected from a plurality of small areas. For example, in an aspect in which one small area is created in the small area creation step, the one small area may be selected by the control device in the selection step.

D5. Alternative Embodiment 5

In the embodiment described above, the imaging unit 10 is a stereo camera. For example, the imaging unit may be a monocular camera, and the depth of a small area may be estimated by using a technique of estimating the depth using a monocular camera. In addition, a two-dimensional image may be a color image or a grayscale image.

D6. Alternative Embodiment 6

(1) In the embodiment described above, the arrangement step is included. For example, in a system that does not include a robot, the arrangement step may not be executed.

(2) In the embodiment described above, the end determination step is included. For example, in an aspect in which one small area is created in the small area creation step, the process may end without executing the end determination step. In addition, in the aspect in which one small area is created in the small area creation step, the process may end when the end determination step is executed to determine that all the objects surrounded by the small areas have been arranged at the arrangement location by the robot.

(3) In the first embodiment described above, in the end determination step, when the object surrounded by the small area is included in the image, the process proceeds to the selection step when it is determined that not all of the objects surrounded by the small areas are arranged at the arrangement location by the robot 20. Note that, for example, when it is determined in the end determination step that not all of the objects surrounded by the small areas are arranged at the arrangement location by the robot, the process may proceed to the image acquisition step to acquire an image again and create a small area.

For example, when the process proceeds from the end determination step to the image acquisition step again, the position or posture of the object arranged in the work area may be changed by the operator or the robot. For a small area having a reliability lower than a predetermined value, it may be possible to estimate the posture of the object with high reliability by making the robot or the operator change its position or posture.

D7. Alternative Embodiment 7

(1) In the embodiment described above, the robot system 1 includes the robot 20. For example, a system that includes an imaging unit and a control device without including a robot may be adopted. In addition, the control device is not limited to one that controls a robot system.

(2) For example, the robot may include the control device, or the imaging unit may include the control device.

(3) In the embodiment described above, the robot system 1 includes the display 30 and the input device 40. For example, the robot system may not include the display and the input device.

E. Other Forms

The present disclosure is not limited to the above-described embodiments, and can be implemented in various forms without departing from the scope of the present disclosure. For example, the present disclosure can also be implemented by the following aspects. The technical features in the above-described embodiments corresponding to the technical features in the respective aspects described below can be appropriately rearranged or combined in order to address some or all of the issues of the present disclosure or in order to achieve some or all of the effects of the present disclosure. In addition, if the technical features are not described as essential in the present specification, the technical features can be appropriately deleted.

(1) According to an aspect of the present disclosure, there is provided a method for estimating a posture of an object. The method for estimating a posture of an object includes: an image acquisition step of acquiring, by an imaging unit configured to image an area in which a plurality of objects are arranged, a two-dimensional image including at least one of the plurality of objects; a small area creation step of creating, for at least one object among the at least one object in the two-dimensional image, a small area surrounding the object; a type estimation step of estimating a type of the object surrounded by the small area; a selection step of selecting one of the small areas in which the type of the object has been estimated in the type estimation step; a depth estimation step of estimating a depth of the one of the small areas based on the two-dimensional image; and a posture estimation step of estimating a three-dimensional posture of the object included in the one of the small areas based on the type of the object and the depth estimated in the depth estimation step.

According to the method for estimating a posture of an object of this aspect, it is possible to estimate the posture of the object in consideration of the depth of the object.

(2) The method for estimating a posture of an object according to the aspect described above may further include an instruction step of instructing a robot to grasp the object based on the three-dimensional posture of the object.

According to the method for estimating a posture of an object of this aspect, it is possible to give the robot an instruction based on the posture of the object estimated in consideration of the depth of the object.

(3) In the method for estimating a posture of an object according to the aspect described above, in the depth estimation step, the depth of the one of the small areas may be estimated using a trained model prepared in advance according to the type of the object.

According to the method for estimating a posture of an object of this aspect, the depth is estimated using a trained model corresponding to the type of the object. For example, it is possible to reduce learning data and learning time compared to an aspect in which the trained model calculates the depths of all of the plurality of objects based on the depth of the area including all of the plurality of different types of objects. In addition, for example, when the type of the object is changed, a trained model for only the new object may be created, and it is not necessary to cause the trained model to learn the depth of the area including all of the plurality of different types of objects again. Therefore, it is possible to efficiently operate the method for estimating the posture of the object.

(4) In the method for estimating a posture of an object according to the aspect described above, in the image acquisition step, a two-dimensional image including two or more of the plurality of objects may be acquired. In the small area creation step, a small area surrounding the object may be created for each of two or more objects among the objects included in the two-dimensional image. In the selection step, the one of the small areas may be selected based on a degree of reliability of the type of the object surrounded by the small area, the degree of reliability being output from a trained model that estimates the type of the object and creates the small area.

According to the method for estimating a posture of an object of this aspect, since the posture is estimated for the object having high reliability, the accuracy of the estimated posture may be higher than that of the object having low reliability. Therefore, there is a high possibility that the robot can reliably grasp the object.

(5) In the method for estimating a posture of an object according to the aspect described above, in the image acquisition step, a two-dimensional image including two or more of the plurality of objects may be acquired. In the small area creation step, a small area surrounding the object may be created for each of two or more objects among the objects included in the image. In the type estimation step, coordinates of the small area may be further estimated. In the selection step, the one of the small areas may be selected based on coordinates of each of the small areas.

According to the method for estimating a posture of an object of this aspect, it is possible to cause the robot to grasp the object based on the coordinates of the small area surrounding the object. Therefore, the robot can quickly grasp the object.

(6) In the method for estimating a posture of an object according to the aspect described above, in the image acquisition step, a two-dimensional image including two or more of the plurality of objects may be acquired. In the small area creation step, a small area surrounding the object may be created for each of two or more objects among the objects included in the image. In the selection step, the one of the small areas may be selected based on a predetermined order of the objects to be grasped by the robot.

According to the method for estimating a posture of an object of this aspect, it is possible to cause the robot to arrange a plurality of objects at predetermined locations so as to overlap each other.

(7) In the method for estimating a posture of an object according to the aspect described above, the imaging unit may be a stereo camera.

For example, when depth information of a two-dimensional image is acquired using RGBD, the imaging timings of the RGB camera and the Depth camera may be different from each other. According to the method for estimating a posture of an object of this aspect, since the stereo camera is used, it is possible to estimate the depth based on a plurality of two-dimensional images captured at the same time. Therefore, images and depths acquired at the same time can be acquired. Therefore, for example, even when the object is being transported on a conveyor belt, the posture of the object can be accurately estimated.

(8) According to another aspect of the present disclosure, a method for a robot to grasp an object is provided. The method for a robot to grasp an object includes: the instruction step in the method for estimating a posture of an object according to (2); an arrangement step of grasping one of the objects and arranging the one of the objects at a predetermined location by the robot based on the instruction; and an end determination step of determining, after the arrangement step, whether all the objects surrounded by the small areas created in the small area creation step have been arranged at the predetermined location by the robot. When it is determined that not all of the objects surrounded by the small areas created in the small area creation step are arranged at the predetermined location by the robot, the method proceeds to the selection step to select the small area that has not been selected, and when it is determined that all of the objects surrounded by the small areas created in the small area creation step have been arranged at the predetermined location by the robot, the method ends.

According to the method for a robot to grasp an object of this aspect, it is possible to cause the robot to grasp a plurality of objects.

(9) According to another aspect of the present disclosure, a control device is provided. The control device controls: an imaging unit configured to image an area in which a plurality of objects are arranged, the imaging unit being configured to acquire a two-dimensional image including at least one of the plurality of objects; and a robot capable of grasping an object. The control device creates, for at least one object among the at least one object in the two-dimensional image, a small area surrounding the object, estimates a type of the object surrounded by the small area, selects one of the small areas in which the type of the object has been estimated, estimates a depth of the one of the small areas based on the two-dimensional image, estimates a three-dimensional posture of the object included in the one of the small areas based on the type of the object and the estimated depth, and instructs the robot to grasp the object based on the three-dimensional posture of the object.

(10) According to another aspect of the present disclosure, a robot system is provided. The robot system includes: an imaging unit configured to image an area in which a plurality of objects are arranged, the imaging unit being configured to acquire a two-dimensional image including at least one of the plurality of objects; a robot capable of grasping an object; and a control device controlling the imaging unit and the robot. The control device creates, for at least one object among the at least one object in the two-dimensional image, a small area surrounding the object, estimates a type of the object surrounded by the small area, selects one of the small areas in which the type of the object has been estimated, estimates a depth of the one of the small areas based on the two-dimensional image, estimates a three-dimensional posture of the object included in the one of the small areas based on the type of the object and the estimated depth, and instructs the robot to grasp the object based on the three-dimensional posture of the object.

(11) In the robot system according to the aspect described above, the imaging unit may be a stereo camera.

The present disclosure can also be implemented in various forms other than the method for estimating a posture of an object, the method for a robot to grasp an object, the control device, and the robot system. For example, the present disclosure can be implemented in the form of a computer program implementing a control device, a method for manufacturing a robot system, a method for controlling a control device or a robot system, a method for verifying whether the control method or an estimated posture is correct, or a method for a robot to grasp an object, a non-transitory recording medium in which the computer program is recorded, and the like.

What is claimed is:

1. A method for causing a processor to execute a program stored in a memory, the method comprising executing on the processor the steps of:

an image acquisition step of causing a camera to image an area in which a plurality of objects are arranged and obtain a two-dimensional image including a first object of the plurality of objects;

a sub-area creation step of creating a sub-area surrounding the first object;

a type estimation step of estimating a type of the first object surrounded by the sub-area;

a depth estimation step of estimating a depth of the sub-area based on the two-dimensional image using a trained model prepared in advance according to the type of the first object; and a posture estimation step of estimating a three-dimensional posture of the first object included in the sub-area based on the type of the first object and the depth estimated in the depth estimation step.

2. The method for estimating a posture of an object according to claim 1, further comprising an instruction step of instructing a robot to grasp the first object based on the three-dimensional posture of the first object.

3. The method for estimating a posture of an object according to claim 2, wherein in the image acquisition step, the two-dimensional image including two or more objects of the plurality of objects is acquired, and the two or more objects includes the first object and a second object, in the sub-area creation step, another sub-area surrounding the second object is created, and the sub-area is selected based on a predetermined order of the plurality of objects to be grasped by the robot.

4. The method for estimating a posture of an object according to claim 1, wherein in the image acquisition step, the two-dimensional image including two or more objects of the plurality of objects is acquired, and the two or more objects includes the first object and a second object, in the sub-area creation step, another sub-area surrounding the second object is created, in the type estimation step, a type of the second object surrounded by the another sub-area is estimated, and the sub-area is selected based on a degree of reliability between the type of the first object and the type of the second object, and the degree of reliability is output from the trained model that estimates the type of the first object and the type of the second object, and creates the sub-area and the another sub-area.

5. The method for estimating a posture of an object according to claim 1, wherein in the image acquisition step, the two-dimensional image including two or more objects of the plurality of objects is acquired, and the two or more objects includes the first object and a second object, in the sub-area creation step, another sub-area surrounding the second object is created, in the type estimation step, a type of the second object surrounded by the another sub-area is estimated and coordinates of the sub-area and the another sub-area are further estimated, and the sub-area is selected based on the coordinates of each of the sub-area and the another sub-area.

6. The method for estimating a posture of an object according to claim 1, wherein the camera is a stereo camera.

7. A control device comprising:

a camera configured to image an area in which a plurality of objects are arranged and obtain a two-dimensional image including a first object of the plurality of objects;

a memory configured to store a program; and a processor configured to execute the program so as to:

create a sub-area surrounding the first object;

estimate a type of the first object surrounded by the sub-area;

estimate a depth of the sub-area based on the two-dimensional, image using a trained model prepared in advance according to the type of the first object;

estimate a three-dimensional posture of the first object included in the sub-area based on the type of the first object and the estimated depth; and instruct a robot to grasp the first object based on the three-dimensional posture of the first object.

8. A robot system, comprising;

a camera configured to image an area in which a plurality of objects are arranged and obtain a two-dimensional image including a first object of the plurality of objects;

a robot configured to grasp the plurality of objects;

a memory configured to store a program; and a processor configured to execute the program so as to:

create a sub-area surrounding the first object;

estimate a type of the first object surrounded by the sub-area;

estimate a depth of the sub-area based on the two-dimensional, image using a trained model prepared in advance according to the type of the first object;

estimate a three-dimensional posture of the first object included in the sub-area based on the type of the first object and the estimated depth; and instruct the robot to grasp the first object based on the three-dimensional posture of the first object.

9. The robot system according to claim 8, wherein the camera is a stereo camera.

* * * * *